US007667699B2

(12) United States Patent
Komar et al.

(10) Patent No.: US 7,667,699 B2
(45) Date of Patent: Feb. 23, 2010

(54) FAST RENDERING OF PYRAMID LENS DISTORTED RASTER IMAGES

(76) Inventors: Robert Komar, 3412 W. 2$^{nd}$ Avenue, Vancouver, British Columbia (CA) V6R 1J2; Garth B. D. Shoemaker, 507 Jefferson Avenue, Coquitlam, British Columbia (CA) V3J 3T7; Mark Tigges, 106-1683 Adanac Street, Vancouver, British Columbia (CA) V5I 2C7

( * ) Notice: Subject to any disclaimer, the term of this patent is extended or adjusted under 35 U.S.C. 154(b) by 66 days.

(21) Appl. No.: 10/358,394

(22) Filed: Feb. 5, 2003

(65) Prior Publication Data

US 2003/0151626 A1  Aug. 14, 2003

(30) Foreign Application Priority Data

Feb. 5, 2002  (CA) .................................... 2370752

(51) Int. Cl.
*G06T 15/10* (2006.01)
*G09G 5/00* (2006.01)

(52) U.S. Cl. ...................... 345/427; 345/647; 345/660; 345/661; 345/619; 345/440; 345/440.1; 345/629; 345/666; 345/670; 715/763; 715/767; 715/864; 715/866; 715/848; 715/851

(58) Field of Classification Search ................ 345/647, 345/611, 619, 581, 661–662, 585, 800, 427, 345/440, 440.1, 629, 666, 668, 670, 671, 345/428; 715/763, 767, 864, 866, 848, 851
See application file for complete search history.

(56) References Cited

U.S. PATENT DOCUMENTS 3,201,546 A  8/1965  Richardson (Continued)

FOREIGN PATENT DOCUMENTS

CA  2350342  11/2002

(Continued)

OTHER PUBLICATIONS

Carpendale, M.S.T., et al., "A Framework for Unifying Presentation Space", Proc. of the 14th Annual ACM Symposium on User Interface Software and Technology, Orlando, FL, USA, Nov. 11-14, 2001, p. 61-70.*

(Continued)

*Primary Examiner*—Jin-Cheng Wang (57) ABSTRACT

A method for generating a presentation of a region-of-interest in an information representation including the steps of: selecting a viewpoint for the region-of-interest; creating a lens surface for the region-of-interest; the lens surface having a focal region and a shoulder region surrounding the focal region; creating a transformed presentation by: determining boundaries in the representation for the focal region and the shoulder region; determining boundaries on the lens surface corresponding to the boundaries in the representation by applying a distortion function defining the lens surface to the boundaries in the representation; perspectively projecting the boundaries on the lens surface onto a plane spaced from the viewpoint; and, copying information in the representation lying within the boundaries in the representation onto the focal region and the shoulder region of the lens surface using respective focal region and shoulder region stretch bit-block transfer operations; and, displaying the transformed presentation on a display screen to generate the presentation of the region-of-interest.

39 Claims, 8 Drawing Sheets

U.S. PATENT DOCUMENTS

| | | |
|---|---|---|
| 4,581,647 A | 4/1986 | Vye |
| 4,630,110 A | 12/1986 | Cotton et al. |
| 4,688,181 A | 8/1987 | Cottrell et al. |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,985,849 A | 1/1991 | Hideaki |
| 4,992,866 A | 2/1991 | Morgan |
| 5,048,077 A | 9/1991 | Wells et al. |
| 5,175,808 A | 12/1992 | Sayre |
| 5,185,599 A * | 2/1993 | Doornink et al. ............ 345/548 |
| 5,185,667 A | 2/1993 | Zimmermann |
| 5,200,818 A | 4/1993 | Neta et al. |
| 5,206,721 A | 4/1993 | Ashida et al. |
| 5,227,771 A | 7/1993 | Kerr et al. |
| 5,250,934 A * | 10/1993 | Denber et al. ................ 345/611 |
| 5,258,837 A | 11/1993 | Gormley |
| 5,321,807 A | 6/1994 | Mumford |
| 5,329,310 A | 7/1994 | Liljegren et al. |
| 5,341,466 A | 8/1994 | Perlin et al. |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick et al. |
| 5,651,107 A | 7/1997 | Frank et al. |
| 5,652,851 A | 7/1997 | Stone et al. |
| 5,657,246 A | 8/1997 | Hogan et al. |
| 5,670,984 A * | 9/1997 | Robertson et al. ............ 345/585 |
| 5,680,524 A | 10/1997 | Maples et al. |
| 5,682,489 A | 10/1997 | Harrow et al. |
| 5,689,287 A * | 11/1997 | Mackinlay et al. .......... 345/427 |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A * | 6/1999 | Dye ............................ 345/582 |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,154,840 A | 11/2000 | Pebley et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 * | 7/2001 | Adler et al. ................. 358/442 |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,678 B1 | 2/2003 | Boger |
| 6,522,341 B1 | 2/2003 | Nagata |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 * | 6/2003 | Kashiwagi et al. .......... 345/581 |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |
| 6,690,387 B2 | 2/2004 | Zimmerman et al. |
| 6,720,971 B1 | 4/2004 | Yamamoto et al. |

| | | | | | | |
|---|---|---|---|---|---|---|
| 6,727,910 B2 * | 4/2004 | Tigges ................... 345/647 | | 2003/0052896 A1 | 3/2003 | Higgins et al. |
| 6,731,315 B1 | 5/2004 | Ma et al. | | 2003/0061211 A1 | 3/2003 | Shultz et al. |
| 6,744,430 B1 | 6/2004 | Shimizu | | 2003/0100326 A1 | 5/2003 | Grube et al. |
| 6,747,610 B1 | 6/2004 | Taima et al. | | 2003/0105795 A1 | 6/2003 | Anderson et al. |
| 6,747,611 B1 | 6/2004 | Budd et al. | | 2003/0112503 A1 | 6/2003 | Lantin |
| 6,760,020 B1 | 7/2004 | Uchiyama et al. | | 2003/0118223 A1 | 6/2003 | Rahn et al. |
| 6,768,497 B2 * | 7/2004 | Baar et al. ................ 345/661 | | 2003/0137525 A1 | 7/2003 | Smith |
| 6,798,412 B2 * | 9/2004 | Cowperthwaite ........... 345/428 | | 2003/0151625 A1 | 8/2003 | Shoemaker |
| 6,833,843 B2 | 12/2004 | Mojaver et al. | | 2003/0151626 A1 | 8/2003 | Komar et al. |
| 6,842,175 B1 | 1/2005 | Schmalstieg et al. | | 2003/0174146 A1 | 9/2003 | Kenoyer |
| 6,874,126 B1 | 3/2005 | Lapidous | | 2003/0179198 A1 | 9/2003 | Uchiyama |
| 6,882,755 B2 | 4/2005 | Silverstein et al. | | 2003/0179219 A1 | 9/2003 | Nakano et al. |
| 6,906,643 B2 | 6/2005 | Samadani et al. | | 2003/0179237 A1 | 9/2003 | Nelson et al. |
| 6,911,975 B2 | 6/2005 | Iizuka et al. | | 2003/0196114 A1 | 10/2003 | Brew et al. |
| 6,919,921 B1 | 7/2005 | Morota et al. | | 2003/0210281 A1 | 11/2003 | Ellis et al. |
| 6,924,822 B1 | 8/2005 | Card et al. | | 2003/0227556 A1 | 12/2003 | Doyle |
| 6,938,218 B1 | 8/2005 | Rosen | | 2003/0231177 A1 | 12/2003 | Montagnese et al. |
| 6,956,590 B1 | 10/2005 | Barton et al. | | 2004/0026521 A1 | 2/2004 | Colas et al. |
| 6,961,071 B2 | 11/2005 | Montagnese et al. | | 2004/0056869 A1 | 3/2004 | Jetha et al. |
| 6,975,335 B2 | 12/2005 | Watanabe | | 2004/0056898 A1 | 3/2004 | Jetha et al. |
| 6,985,865 B1 | 1/2006 | Packingham et al. | | 2004/0111332 A1 | 6/2004 | Baar et al. |
| 7,038,680 B2 | 5/2006 | Pitkow | | 2004/0125138 A1 | 7/2004 | Jetha et al. |
| 7,055,095 B1 | 5/2006 | Anwar | | 2004/0150664 A1 | 8/2004 | Baudisch |
| 7,071,971 B2 | 7/2006 | Elberbaum | | 2004/0194014 A1 | 9/2004 | Anwar |
| 7,084,886 B2 | 8/2006 | Jetha et al. | | 2004/0217979 A1 | 11/2004 | Baar et al. |
| 7,088,364 B2 | 8/2006 | Lantin | | 2004/0240709 A1 | 12/2004 | Shoemaker |
| 7,106,349 B2 | 9/2006 | Baar et al. | | 2004/0257375 A1 | 12/2004 | Cowperthwaite |
| 7,133,054 B2 | 11/2006 | Aguera y Arcas | | 2004/0257380 A1 | 12/2004 | Herbert et al. |
| 7,134,092 B2 | 11/2006 | Fung et al. | | 2005/0041046 A1 | 2/2005 | Baar et al. |
| 7,158,878 B2 | 1/2007 | Rasmussen et al. | | 2005/0134610 A1 | 6/2005 | Doyle et al. |
| 7,173,633 B2 | 2/2007 | Tigges | | 2005/0259118 A1 | 11/2005 | Mojaver et al. |
| 7,173,636 B2 | 2/2007 | Montagnese | | 2005/0278378 A1 | 12/2005 | Frank |
| 7,197,719 B2 | 3/2007 | Doyle et al. | | 2005/0285861 A1 | 12/2005 | Fraser |
| 7,213,214 B2 | 5/2007 | Baar et al | | 2006/0022955 A1 | 2/2006 | Kennedy |
| 7,233,942 B2 | 6/2007 | Nye | | 2006/0026521 A1 | 2/2006 | Hotelling et al. |
| 7,246,109 B1 | 7/2007 | Ramaswamy | | 2006/0033762 A1 | 2/2006 | Card et al. |
| 7,256,801 B2 | 8/2007 | Baar et al. | | 2006/0036629 A1 | 2/2006 | Gray |
| 7,274,381 B2 | 9/2007 | Mojaver et al. | | 2006/0082901 A1 | 4/2006 | Shoemaker |
| 7,275,219 B2 | 9/2007 | Shoemaker | | 2006/0098028 A1 | 5/2006 | Baar |
| 7,280,105 B2 | 10/2007 | Cowperthwaite | | 2006/0139375 A1 | 6/2006 | Rasmussen et al. |
| 7,283,141 B2 | 10/2007 | Baar et al. | | 2006/0192780 A1 | 8/2006 | Lantin |
| 7,310,619 B2 | 12/2007 | Baar et al. | | 2006/0214951 A1 | 9/2006 | Baar et al. |
| 7,312,806 B2 | 12/2007 | Tigges | | 2007/0033543 A1 | 2/2007 | Ngari et al. |
| 7,321,824 B1 | 1/2008 | Nesbitt | | 2007/0064018 A1 | 3/2007 | Shoemaker et al. |
| 7,411,610 B2 | 8/2008 | Doyle | | 2007/0097109 A1 | 5/2007 | Shoemaker et al. |
| 7,423,660 B2 | 9/2008 | Ouchi et al. | | 2009/0141044 A1 | 6/2009 | Shoemaker |
| 7,450,114 B2 | 11/2008 | Anwar | | 2009/0147023 A1 | 6/2009 | Jetha et al. |
| 7,472,354 B2 | 12/2008 | Jetha et al. | | 2009/0172587 A1 | 7/2009 | Carlisle |
| 7,486,302 B2 | 2/2009 | Shoemaker | | 2009/0265656 A1 | 10/2009 | Zeenat |
| 7,489,321 B2 | 2/2009 | Jetha et al. | | 2009/0284542 A1 | 11/2009 | Baar |
| 7,495,678 B2 | 2/2009 | Doyle et al. | | | | |
| 7,580,036 B2 | 8/2009 | Montagnese | | | | |
| 2001/0040585 A1 | 11/2001 | Hartford et al. | | | | |
| 2001/0040636 A1 | 11/2001 | Kato et al. | | | | |
| 2001/0048447 A1 | 12/2001 | Jogo | | | | |
| 2001/0055030 A1 | 12/2001 | Han | | | | |
| 2002/0033837 A1 | 3/2002 | Munro | | | | |
| 2002/0038257 A1 | 3/2002 | Joseph et al. | | | | |
| 2002/0044154 A1 | 4/2002 | Baar et al. | | | | |
| 2002/0062245 A1 | 5/2002 | Niu et al. | | | | |
| 2002/0075280 A1 | 6/2002 | Tigges | | | | |
| 2002/0087894 A1 | 7/2002 | Foley et al. | | | | |
| 2002/0089520 A1 | 7/2002 | Baar et al. | | | | |
| 2002/0093567 A1 | 7/2002 | Cromer et al. | | | | |
| 2002/0101396 A1 | 8/2002 | Huston et al. | | | | |
| 2002/0122038 A1 | 9/2002 | Cowperthwaite | | | | |
| 2002/0135601 A1 | 9/2002 | Watanabe et al. | | | | |
| 2002/0143826 A1 | 10/2002 | Day et al. | | | | |
| 2002/0171644 A1 | 11/2002 | Reshetov et al. | | | | |
| 2002/0180801 A1 | 12/2002 | Doyle et al. | | | | |
| 2003/0006995 A1 | 1/2003 | Smith et al. | | | | |
| 2003/0007006 A1 | 1/2003 | Baar et al. | | | | |
| 2003/0048447 A1 | 3/2003 | Harju et al. | | | | |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 1/1998 |
| EP | 0816983 | 7/1998 |

OTHER PUBLICATIONS

Sheelagh M.,Carpendale,T.,Cowperthwaite,D.J.,and Fracchia, F. D. Distortion Viewing Techniques for 3-Dimensional Data. IEEE Symposium on Information Visualization, San Francico, CA, Oct. 28-29, 1996, pp. 46-53.*

M. S. T. Carpendale, D. J. Cowperthwaite, and F. D. Fracchia, "3-Dimensional Pliable Surfaces: For the Effective Presentation of Visual Information", In Proceedings of UIST'95, pp. 217-226.*

M.S.T. Carpendale, D.J. Cowperthwaite, F.D. Fraccia, and T. Shermer, "Graph folding: Extending detail and context viewing into a tool for subgraph comparisons", In Proceedings of Graph Drawing 1995, Passau, Germany, pp. 127-139.*

M. Sarkar, S. S. Snibbe, O. J. Tversky, S. P. Reiss, "Stretching the rubber sheet: a metaphor for viewing large layouts on small screens", Proc. of the 6th annual ACM symp. on User interface software and technology, p. 81-91, Dec. 1993, Atlanta, GA.*

M.S.T. Carpendale "A Framework for Elastic Presentation Space", http://pages.cpsc.ucalgary.ca/~sheelagh/personal/thesis/, Nov. 19, 1999.*

Carpendale, Marianne S. T., A Framework for Elastic Presentation Space, Simon Fraser University,1999.

Carpendale, M.S.T., et al., "A Framework for Unifying Presentation Space", 01UIST, Proceedings of the 14th Annual ACM Symposium on User Interface Software And Technology, Proceedings of UIST'01: ACM Symposium on User Interface Software and Technology, Orlando, FL, USA, Nov. 11-14, 2001, pp. 61-70.

Ikedo, T., "A Realtime Video-image Mapping Using Polygon Rendering Techniques", Multimedia Computing and Systems '97. Proceedings., IEEE Intl. Conf. On Ottawa, Ont., Can. Jun. 3-6, 1997, pp. 127-134.

Bouju, A. et al., "Client-server Architecture for Accessing Multimedia and Geographic Databases within Embedded Systems", Database and Expert Systems Applications, 1999. Proceedings. Tenth Intl. Workshop on, Flor., Italy Sep. 1-3, 1999, Los Alamitos, CA, USA, IEEE Comp. Soc, US, Sep. 1, 1999, pp. 760-764.

Robertson, G. et al., "The Document Lens", UIST. Proceed. of the Ann. ACM Symp. on User Interface Software and Tech., Nov. 3, 1993. pp. 101-108.

Robertson, et al., ""The Document Lens"", Cited by examiner, (1993),pp. 101-108.

Carpendale, Marianne Sheelagh T., ""A Framework for Elastic Presentation Space"", Simon Fraser University, Burnaby; British Columbia XP001051168; Cited by Examiner, cited in the application figures 2.13, 3.1-3.31, 4.1-4.19, 5.14,(1999),pp. 7, 14, 34, 38, 65, 112, 123, and 126.

"Non Final on OA", U.S. Appl. No. 11/935,222, filed Feb. 20, 2009,12 pages.

Dursteler, Juan C., "The digital magazine of InfoVis.net", Retrieved from: http://www.infovis.net/printMag.php?num=85&lang=2; cited by examiner, (Apr. 22, 2002).

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).

Kuederle, Oliver "Presentation of Image Sequences: A Detail-in-Context Approach", Thesis, Simon Fraser University; Cited by Examiner, (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin, IBM Corp.*, New York, US, vol. 37, No. 3; XP000441501, ISSN: 0018-8689 the whole document; Cited by Examiner, (Mar. 1, 1994),pp. 353-354.

Keahey, T. A., ""The Generalized Detail-In-Context Problem"", *Information Visualization 1998, Proceedings; IEEE Symposium On Research Triangle*, CA, USA; Los Alamitos, CA, USA, IEEE Comput. Soc, US; Cited by Examiner,.XP010313304; ISBN: 0-8186-9093,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology*; cited by examiner, (Dec. 1995).

Carpendale, M S T et al., ""Extending distortion viewing from 2D to 3D"", *IEEE Computer Graphics and Applications*, IEEE Inc. New York, US, vol. 17, No. 4; XP000927815, ISSN: 0272-1716. Cited by Examiner, (Jul. 1997),pp. 42-51.

Viega, J et al., ""3D magic lenses"", *Proceedings of the 9th annual ACM symposium on User interface software and technology*; Pub 1996 ACM Press New York, NY, USA; cited by examiner, (1996),51-58.

Cowperthwaite, David J., ""Occlusion Resolution Operators for Three-Dimensional Detail-In-Context"", Burnaby, British Columbia: Simon Fraser University; cited by examiner, (2000).

Carpendale, M.S.T. ""A Framework For Elastic Presentation Space"", Thesis Simon Fraser University, XP001051168; cited in the application, Chapter 3-5; appendix A,B; Cited by Examiner, (Mar. 1999),pp. 1-271.

Carpendale, M.S.T. et al., ""Exploring Distinct Aspects of the Distortion Viewing Paradigm"", *Technical Report TR 97-08*, School of Computer Science, Simon Fraser University, Burnaby, British Columbia, Canada; Cited by examiner, (Sep. 1997).

Cowperthwaite, David J., et al., ""Visual Access for 3D Data"", in *Proceedings of ACM CHI 96 Conference on Human Factors in Computer Systems, Volume 2 of Short Papers: Alternative Methods of Interaction*; cited by examiner, (1996),pp. 175-176.

Keahey, T. A., ""Visualization of High-Dimensional Clusters Using NonLinear Magnification"", *Technical Report LA-UR-98-2776*, Los Alamos National Laboratory; Cited by Examiner, (1998).

Tigges, M. et al., ""Generalized Distance Metrics For Implicit Surface Modeling"", *Proceedings of the Tenth Western Computer Graphics Symposium*; Cited by Examiner, (Mar. 1999).

Bossen, F. J., ""Anisotropic Mesh Generation With Particles"", *Technical Report CMU-CS-96-134*, CS Dept, Carnegie Mellon University; cited by examiner, (May 1996).

Bossen, F. J., et al., ""A Pliant Method For Anisotropic Mesh Generation"", *5th Intl. Meshing Roundtable*; cited by examiner, (Oct. 1996),pp. 63-74.

Wilson, et al., ""Direct Volume Rendering Via 3D Textures"", *Technical Report UCSC-CRL-94-19*, University of California, Santa Cruz, Jack Baskin School of Engineering; cited by examiner, (Jun. 1994).

Carpendale, M.S.T. "A Framework for Elastic Presentation Space", *PhD thesis*, Simon Fraser University; Cited by Examiner, (1999),pp. 69, 72, 78-83,98-100, 240, and 241.

Keahey, T. A., et al., ""Techniques For Non-Linear Magnification Transformations"", *Information Visualization '96, Proceedings IEEE Symposium On*, San Francisco, CA, Los Alamitos, CA, USA, IEEE Comput. Soc, US: Cited by Examiner, XP010201943; ISBN: 0-8186-7668-X the whole document,(Oct. 28, 1996),pp. 38-45.

Tominski, Christian et al., ""Fisheye Tree Views and Lenses for Graph Visualization"", Cited by examiner, pp. 1-8.

Keahey, T. A., ""Getting Along: Composition of Visualization Paradigms"", *Visual Insights, Inc.*; cited by examiner, (2001).

Sakamoto, Chikara et al., ""Design and Implementation of a Parallel Pthread Library (PPL) with Parallelism and Portability"", *Systems and Computers in Japan*, New York, US, vol. 29, No. 2; Cited by Examiner, XP000752780, ISSN: 0882-1666 abstract,(Feb. 1, 1998),pp. 28-35.

Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, IEEE Comput. Soc, USA; Cited by Examiner, XP00224932, ISBN; 0-7695-1784-6 the whole document,(Oct. 9-11, 2002),pp. 460-461.

Welsh, Michelle "Futurewave Software", *Business Wire*; Cited by Examiner, (Nov. 15, 1993).

Lamar, et al., "A Magnification Lens for Interactive Volume Visualization", *ACM*; Cited by Examiner, pp. 1-10.

Fitzmaurice, G. et al., ""Tracking Menus"", *UIST*; Cited by Examiner, (2003),pp. 71-79.

Stone, et al., "The movable filter as a user interface tool", *Proceedings of CHI ACM*; Cited by Examiner, (1992),pp. 306-312.

Baudisch, P. et al., ""Halo: a Technique For Visualizing Off-Screen Locations"", *CHI*; Cited by Examiner, (Apr. 5-10, 2003).

Baudisch, P. et al., ""Drag-And-Pop: Techniques For Accessing Remote Screen Content On Touch-And-Pen-Operated Systems"", *Interact '03*, (2003).

Carpendale, M.S.T. et al., ""Making Distortions Comprehensible"", *Visual Languages, Proceedings*, 1997 IEEE Symposium On Isle of Capri, Italy, Sep. 23-26, 1997, Los Alamitos, CA, USA, IEEE Comput. Soc., US, Sep. 23,1997; Cited by Examiner, XP010250566, ISBN: 0-8186-8144-6,(Sep. 23-26, 1997),pp. 36-45.

Ito, Minoru et al., ""A Three-Level Checkerboard Pattern (TCP) Projection Method for Curved Surface Measurement"", *Pattern Rec-*

*ognition*, Pergamon Press Inc., Elmsford, N.Y., US vol. 28, No. 1; Cited by Examiner, XP004014030, ISSN 0031-3203,(1995),pp. 27-40.

Keahey, T A., et al., ""Nonlinear Magnification Fields"", *Information Visualization, 1997, Proceedings*, IEEE Symposium On Phoenix, AZ, USA, Los Alamitos, CA, USA, IEEE Comput. Soc., US; Cited by Examiner, XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings*, 1999 International Conference On, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; Cited by Ex, (1999),pp. 115-119.

Keahey, T. A., "Nonlinear Magnification", (Indiana University Computer Science), (1997).

Watt, et al., "Advanced Animation and Rendering Techniques", (Addison-Wesley Publishing), (1992),p. 106-108.

Boots, B. N., "Delauney Triangles: An Alternative Approach to Point Pattern Analysis", *Proc. Assoc. Am. Geogr. 6*, (1974),p. 26-29.

Leung, Y. K., et al., ""A Review and Taxonomy of Distortion-Oriented Presentation Techniques"", *ACM Transactions on Computer-Human Interaction*, 'Online! vol. 1, No. 2, XP002252314; Cited by Examiner, Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 11/542,120, filed Jan. 22, 2009,20 pages.

"Non-Final Office Action", U.S. Appl. No. 11/410,024, filed Mar. 11, 2009,35 pages.

"Foreign Office Action", Application Serial No. 2002-536993, (Mar. 11, 2009),2 pages.

"Notice of Allowance", U.S. Appl. No. 11/401,349, filed Apr. 17, 2009,35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Non Final Office Action", U.S. Appl. No. 10/705,199, filed May 12, 2009,46 pages.

"Non Final Office Action", U.S. Appl. No. 11/541,778, filed Jun. 19, 2009, 36 pages.

"Non Final Office Action", U.S. Appl. No. 11/673,038, filed Jul. 13, 2009, 45 pages.

"Non Final Office Action", U.S. Appl. No. 11/410,024, filed Jul. 20, 2009, 27 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, filed Jul. 27, 2009,13 pages.

"Advisory Action", U.S. Appl. No. 11/249,493, filed Aug. 11, 2009,5 pages.

"Advisory Action", U.S. Appl. No. 10/705,199, filed Aug. 18, 2009,5 pages.

"Restriction Requirement", U.S. Appl. No. 11/935,222, filed Aug. 20, 2009,6 pages.

"Advisory Action", U.S. Appl. No. 11/249,493, filed Sep. 14, 2009,4 pages.

"Non-Final Office Action", U.S. Appl. No. 12/364,450, (Sep. 30, 2009), 10 pages.

"Final Office Action", U.S. Appl. No. 11/935,222, (Nov. 24, 2009), 8 pages.

"Final Office Action", U.S. Appl. No. 11/541,778, (Dec. 4, 2009), 12 pages.

"Notice of Allowance", U.S. Appl. No. 11/214,886, (Dec. 15, 2009), 16 pages.

* cited by examiner

FAST RENDERING OF PYRAMID LENS DISTORTED RASTER IMAGES

This application claims priority from Canadian Patent Application No. 2,370,752 filed Feb. 5, 2002, the disclosure of which is incorporated herein by reference.

The invention relates to the field of computer graphics processing and more specifically to a method and system for the fast rendering of pyramid lens distorted raster images in detail-in-context presentations.

BACKGROUND OF THE INVENTION

Display screens are the primary interface for displaying information from a computer. Display screens are limited in size, thus presenting a challenge to graphical user interface design, particularly when large amounts of information are to be displayed. This problem is normally referred to as the "screen real estate problem".

Well-known solutions to this problem include panning, zooming, scrolling or combinations thereof. While these solutions are suitable for a large number of visual display applications, these solutions become less effective where sections of the visual information are spatially related, such as maps, three-dimensional representations, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region" or "detail") in a data presentation while preserving visibility of the surrounding information (the "context"). This technique has applicability to the display of large surface area media, such as maps, on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space may be found in a publication by Marianne S. T. Carpendale, entitles "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension.

One shortcoming of these detail-in-context presentation systems is that the rendering of a raster image which has undergone a distortion through the application of one or more lenses (e.g. pyramid lenses) can be time consuming. Both the CPU and input/output systems of the detail-in-context presentation system can be taxed when performing such a rendering. Past techniques for rendering these images have usually involved texturing the raster image upon a three-dimensional triangulated surface. This technique can provide fast results, especially when combined with the use of accelerated three-dimensional rendering hardware, but rendering can be slow when no such hardware is present. It would be desirable to have a method that allows for the fast rendering of pyramid lenses without the requirement of hardware acceleration.

A need therefore exists for the fast and effective display of pyramid lens presentations in detail-in-context presentation systems. Consequently, it is an object of the present invention to obviate or mitigate at least some of the above mentioned disadvantages.

SUMMARY OF THE INVENTION

In general, the present invention provides for the effective presentation of pyramid lens type presentations in detail-in-context presentation systems through the use of improved rendering techniques.

According to one aspect of this invention, there is provided a method for generating a presentation of a region-of-interest in an information representation including the steps of: selecting a viewpoint for the region-of-interest; creating a lens surface for the region-of-interest; the lens surface having a focal region and a shoulder region surrounding the focal region; creating a transformed presentation by: determining boundaries in the representation for the focal region and the shoulder region; determining boundaries on the lens surface corresponding to the boundaries in the representation by applying a distortion function defining the lens surface to the boundaries in the representation; perspectively projecting the boundaries on the lens surface onto a plane spaced from the viewpoint; and, copying information in the representation lying within the boundaries in the representation onto the focal region and the shoulder region of the lens surface using respective focal region and shoulder region stretch bit-block transfer operations; and, displaying the transformed presentation on a display screen to generate the presentation of the region-of-interest.

Preferably, the lens surface shape is a pyramidal frustum shape having a top and a plurality of sides. The pyramidal frustum shape can be right square with a square shaped top and with first, second, third, and fourth quadrilateral shaped sides. The focal region is generally the top of the pyramidal frustum shape and the shoulder region includes the first, second, third, and fourth sides. The sides can be subdivided into a plurality of slices which can be, for example, one pixel high or wide.

Preferably, the steps of determining boundaries in the representation for the shoulder region and determining boundaries on the lens surface corresponding to the boundaries in the representation include: determining boundaries in the representation for each of the plurality of slices and determining boundaries on the lens surface corresponding to the boundaries in the representation for each of the plurality of slices, respectively. The boundaries can be determined by interpolation. And, the shoulder region stretch bit-block transfer operation can include respective shoulder region stretch bit-block transfer operations for each of the plurality of slices.

Preferably, the sides of the lens surface are subdivided into a plurality of quadrilaterals by a plurality of horizontal or vertical ribs. The plurality of quadrilaterals and ribs can include a plurality of slices. The steps of determining boundaries in the representation for the shoulder region and determining boundaries on the lens surface corresponding to the boundaries in the representation can include: determining boundaries in the representation for each of the plurality of ribs and determining boundaries on the lens surface corresponding to the boundaries in the representation for each of the plurality of ribs, respectively. And, the shoulder region stretch bit-block transfer operation can include respective shoulder region stretch bit-block transfer operations for each of the plurality of ribs or slices. Information for the lens surface lying between the plurality of ribs or slices can be determined by interpolation.

Preferably, the step of copying includes scaling the information. Scaling can include antialiasing and interpolation can include linear interpolation and perspective correct interpolation. In addition, the distortion function can include shoulder functions defining the shoulder regions.

Advantageously, the pyramid lens rendering method of the present invention may be applied to a wide variety of detail-in-context presentations where fast rendering is required and where hardware based accelerating devices are not available. In addition, the present invention does not require time consuming rasterizing of polygonal surfaces.

BRIEF DESCRIPTION OF THE DRAWINGS

Embodiments of the invention may best be understood by referring to the following description and accompanying drawings. In the description and drawings, line numerals refer to like structures or processes. In the drawings:

FIG. 5 (a) is a top view of a texture map in source raster space and the pyramid lens of FIG. 4 in target raster space illustrating the copying of a row of pixels in accordance with an embodiment of the invention;

FIG. 5 (b) is a top view of a texture map in target raster space with an overlaid pyramid lens illustrating the determination of slice edges in accordance with an embodiment of the invention;

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. In the drawings, like numerals refer to like structures or processes.

The term "data processing system" is used herein to refer to any machine for processing data, including the computer systems and network arrangements described herein. The term "Elastic Presentation Space" ("EPS")(or "Pliable Display Technology" ("PDT")) is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in "A Framework for Elastic Presentation Space" (Carpendale, Marianne S. T., *A Framework for Elastic Presentation Space* (Burnaby, British Columbia: Simon Fraser University, 1999)), which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps; surface manipulation or distortion and perspective projection.

Figure 1:
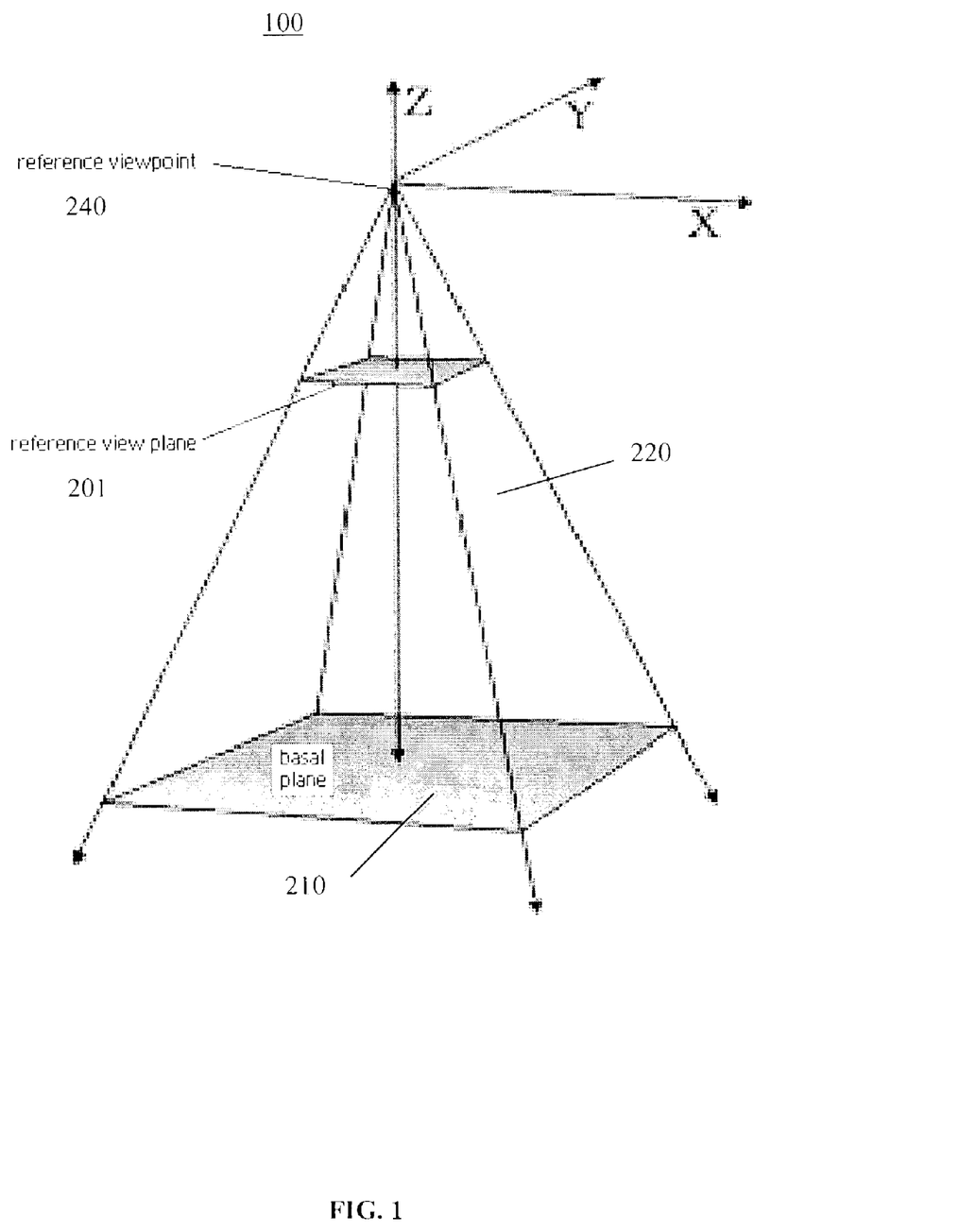
FIG. 1 is a graphical representation of the geometry for constructing a three-dimensional (3D) perspective viewing frustum, relative to an x, y, z coordinate system, in accordance with known elastic presentation space graphics technology.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
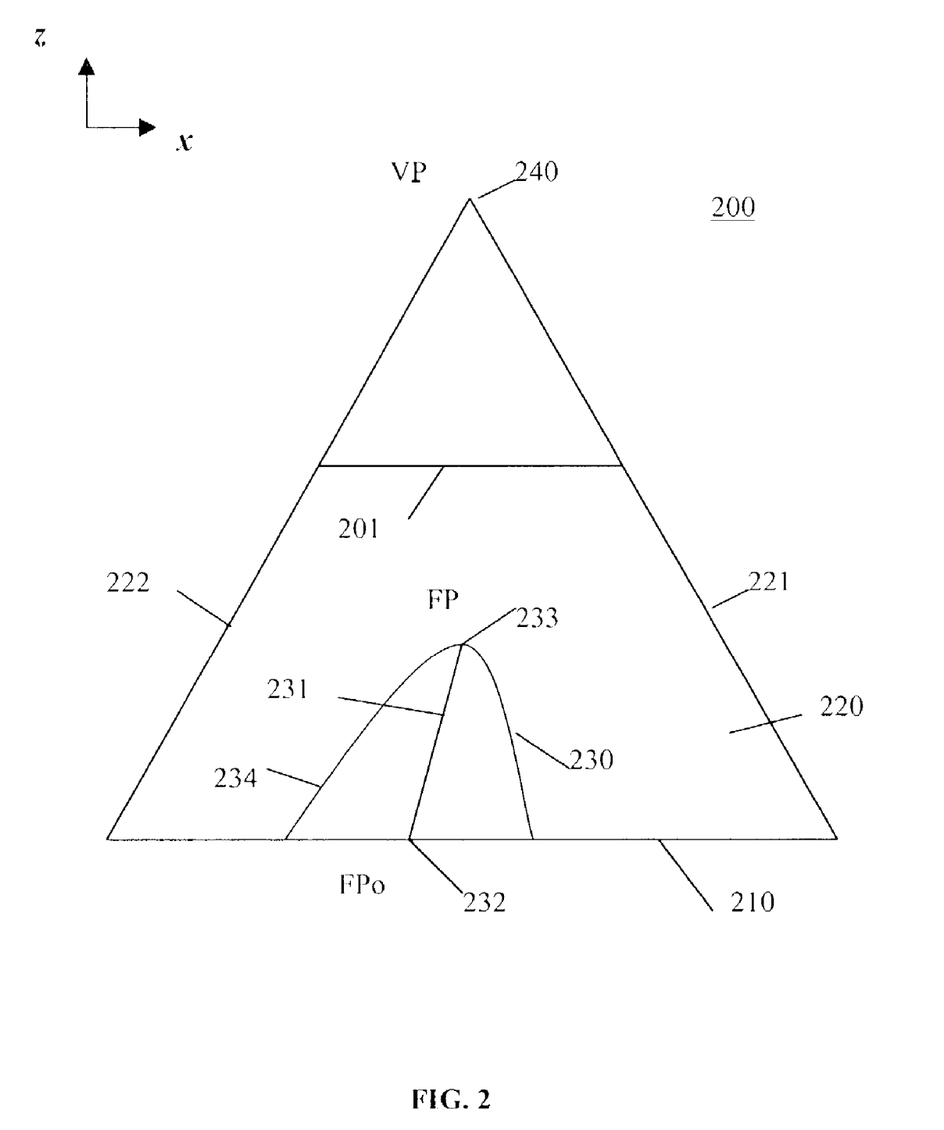
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
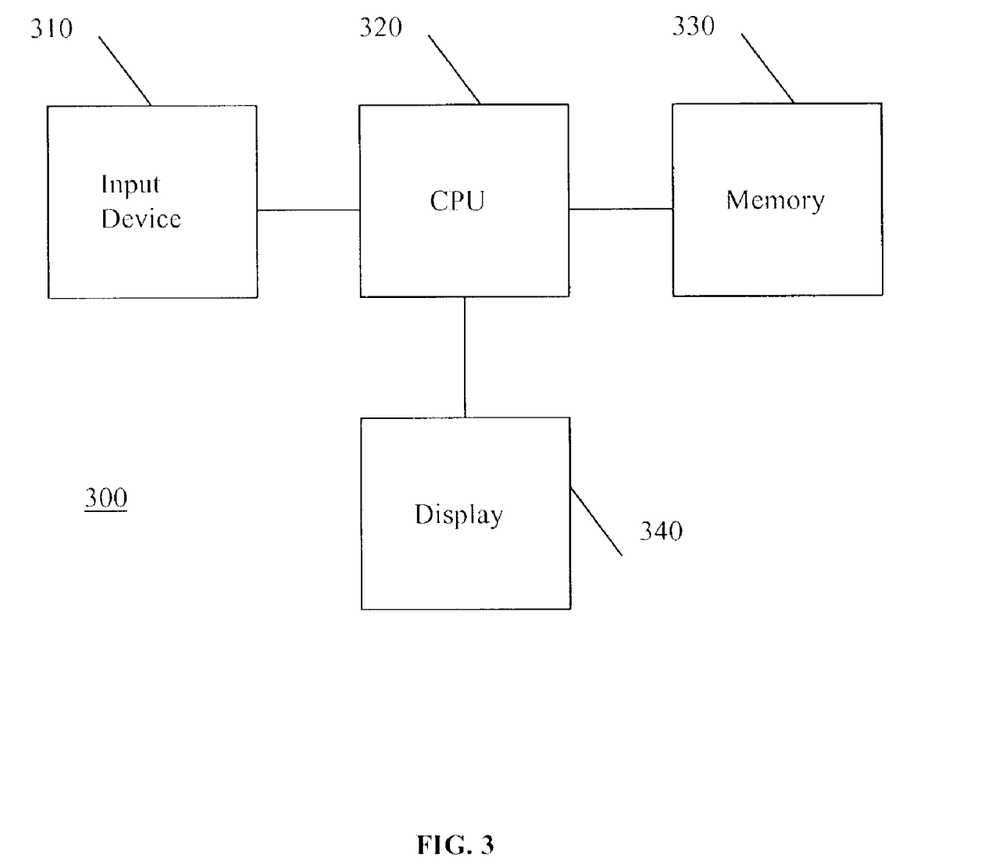
FIG. 3 is a block diagram illustrating an exemplary data processing system for implementing an embodiment of the invention.

System. FIG. 3 is a block diagram of an exemplary data processing system 300 for implementing an embodiment of the invention. The data processing system is suitable for implementing EPS technology and for rendering pyramid lens presentations in conjunction with a graphical user interface ("GUI"). The data processing system 300 includes an input device 310, a central processing unit or CPT 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Method. The problem of rendering a raster image distorted through the use of PDT can be considered to be a problem of transforming texels between two image "spaces." In general, a texel (i.e. texture element) may be defined as a texture map pixel or pixels. The texels from the undistorted image can be said to belong to the "source" image space (i.e. representation), and the texels from the distorted image belong to the "target" image space (i.e. presentation). In general, all rendering approaches must somehow determine color values for each target texel using the known source texels and the known PDT transformation. The present invention takes advantage of symmetry in pyramid lenses across the x and y axis in order to perform fast copies of entire rows or columns of pixels. Improvement in rendering speed is achieved because copying large blocks of pixels is significantly faster than performing multiple copies of individual pixels.

Figure 4:
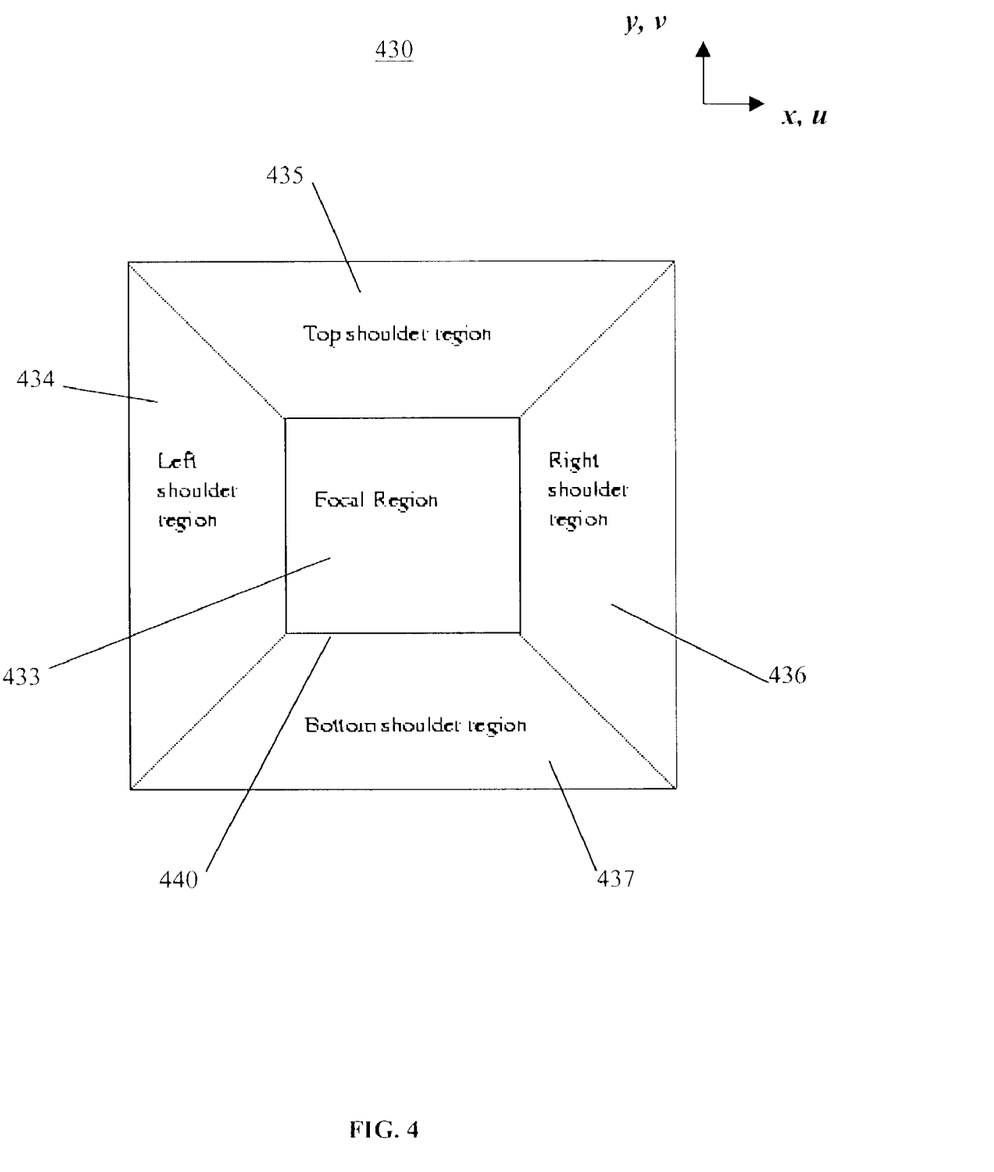
FIG. 4 is a top view of a pyramid lens illustrating pyramid lens regions in accordance with an embodiment of the invention.

FIG. 4 is a top view of a pyramid lens 430 (cf. 230) illustrating pyramid lens regions in accordance with an embodiment of the invention. The pyramid lens 430 can be divided into five distinct regions. As shown in FIG. 4, the pyramid lens 430 has a single square focal region 433 (cf. 233) and four shoulder regions 434, 435, 436, 437 (cf. 234), each of which is a quadrilateral. The focal region 433 may be displaced and the shoulders 434, 435, 436, 437 may be distorted through the application of a folding type distortion function. In addition, the shoulders 434, 435, 436, 437 may be curved through the application of a shoulder function which may include scooping.

In accordance with the invention, the rendering of the focal region 433 of the lens 430 is performed by a single stretch bit block transfer ("stretch BLT" or "stretch blitting") operation. In general, a stretch BLT operation can stretch source data in the x and y axis directions to a target destination larger or smaller that the source. First, the undisplaced rectangular bounds of the focal region are determined or calculated in the source space (i.e. representation). These bounds specify the region in the source space from which information for the focal region 433 will be drawn. By definition, the distortion function defining the lens specifies the extent of the undisplaced focal and shoulder regions for the lens in source space. Second, the displaced rectangular bounds 440 of the focal region 433 are calculated in the target space (i.e. presentation) from application of the distortion function defining the lens to the undisplaced rectangular bounds of the focal region. These bounds 440 specify the region in the target space in which the focal region 433 will be rendered. Third, a single stretch BLT operation from the source raster image to the target raster image is used to fill the focal region 433. To summarize, by definition, lenses define the bounds of their undisplaced focal and shoulder regions in source space and hence this information is known. To find displaced coordinates, the known undisplaced focal and shoulder region bounds are transformed using the "displace" functionality in PDT. Scaling between the bounds in source (i.e. x, y coordinates) and target (i.e. u, v coordinates) spaces is then used to find pixel coordinates for the displaced regions in the target space.

With respect to the rendering of the shoulder regions 434, 435, 436, 437 of the pyramid lens 430, each of the four shoulder regions 434, 435, 436, 437 is rendered individually as follows. The top and bottom shoulder regions 435, 437 are rendered in the same fashion, by copying individual texel rows from source raster to target raster. The left and right shoulder regions 434, 436 are rendered in the same fashion, by copying individual texel columns from source raster to target raster.

Figure 5:
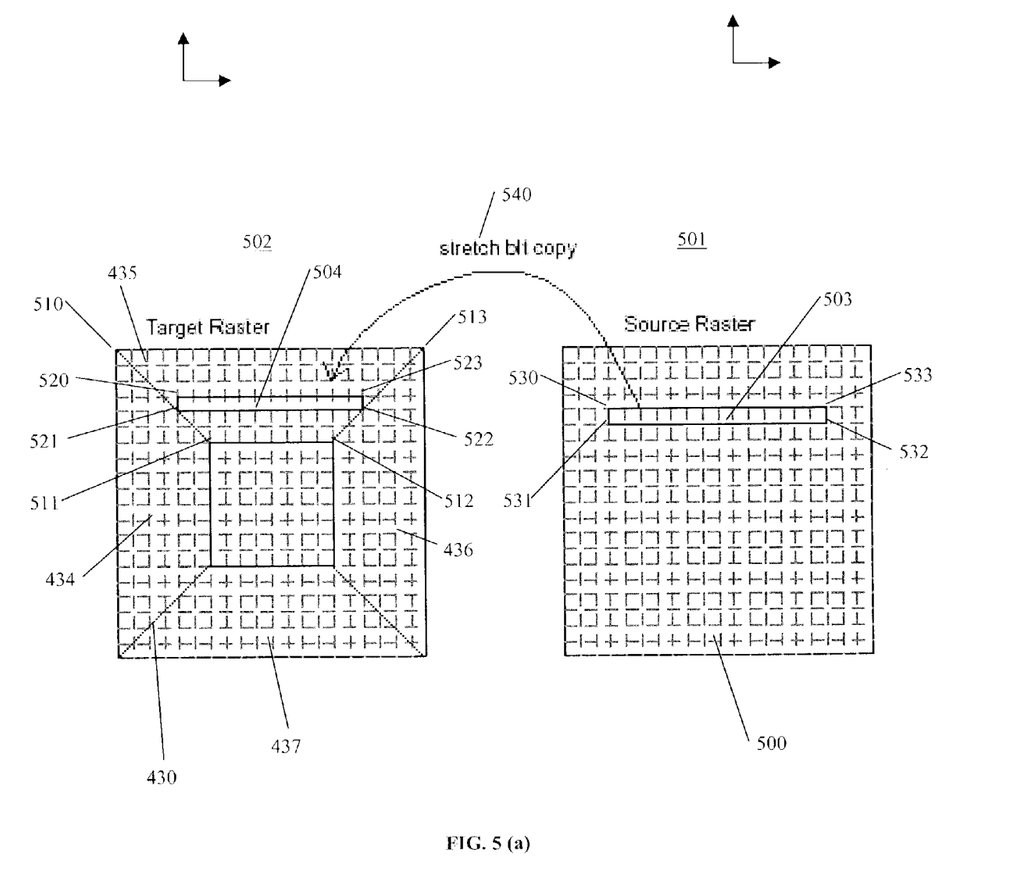

FIG. 5 (a) is a top view of a texture map 500 in source raster space 501 and the pyramid lens 430 of FIG. 4 in target raster space 502 illustrating the copying of a row of pixels 503 in accordance with an embodiment of the invention. The first step in the process of rendering an individual shoulder region 434, 435, 436, 437 is to determine the undisplaced shoulder quadrilateral coordinates (not shown) in source raster space 501 and the displaced shoulder quadrilateral coordinates 510, 511, 512, 513 in target raster space 502. This defines the source region that must be copied into the target region. Because of the discrete nature of pixels, the target quadrilateral 510, 511, 512, 513 is then subdivided into 1-pixel sized slices 504 in order to perform copying. In the case of the top and bottom shoulder regions 435, 437, the slices 504 are 1-pixel high and span the width of the quadrilateral 510, 511, 512, 513. In the case of the left and right shoulder regions 434, 436, the slices (not shown) are 1-pixel wide, and span the height of the quadrilateral 510, 511, 512, 513.

FIG. 5 (b) is a top view of a texture map 560 in target raster space 502 with an overlaid pyramid lens 430 illustrating the determination of slice edges 550 in accordance with an embodiment of the invention. The edges 550 of slices 504 in target space 502 can be determined using a line drawing algorithm, for example, the midpoint line drawing algorithm. This is necessary as not all quadrilateral sides 551, 552, 553, 554 are straight horizontal or vertical lines. For example, in FIG. 5 (b), two 551, 553 of the four sides 551, 552, 553, 554 of each quadrilateral 510, 511, 512, 513 are not perfectly vertical or horizontal. A line drawing algorithm for vertical or horizontal lines would not be necessary as drawing vertical or horizontal lines on a grid of square pixels is trivial. Drawing lines that are neither vertical nor horizontal is non-trivial, and therefore a line drawing algorithm is required to find pixels 550 that serve as endpoints for the slices. The line drawing algorithm is not actually used to draw a line, rather, it is used to find those pixels that would be included in such a line were it drawn and to use those pixels to define the required slices 504.

Note that source slice 503 coordinates 530, 531, 532, 533 can be determined using interpolation. Interpolation may be either standard linear interpolation or perspective correct interpolation. With respect to linear interpolation of texture values, the following procedure can be used. First, assume that p1 and p2 are known positions in space. Also, assume that t1 and t2 are known texture coordinates. A corresponding texture coordinate t3 for a given point p3 that lies between p1 and p2 is found by calculating the fraction of the distance f that p3 lies along the path from p1 to p2 as follows: $f=(p3-p1)/(p2/p1)$. The texture coordinate t3 is then calculated as follows: $t3=t1+f*(t2-t1)$. For perspective correct interpolation, one must also know the z values, z1 and z2, corresponding to the depths of p1 and p2 from the viewpoint 240. The interpolation method described is used to interpolate between $1/z1$ and $1/z2$ to find $1/z3$ as follows: $1/z3=1/z1+f*(1/z2-1/z1)$. Then the same method is used to interpolate between $t1/z1$ and $t2/z2$ to find $t3/z3$. Next, the value $t3/z3$ is multiplied by the inverse of $1/z3$ to determine t3. The t3 value arrived at with this method is the "correct" texture value to be used in cases where textures are mapped onto 3D objects.

Once the source coordinates 530, 531, 532, 533 defining the slice 503 in source raster coordinates 502 and the coordinates 520, 521, 522, 523 defining the slice 504 in target raster coordinates 501 are determined, copying can be performed. A stretch BLT operation 540 is performed to copy the slice 503 from source raster space 501 to target raster space 502 as shown in FIG. 5 (a).

Figure 6:
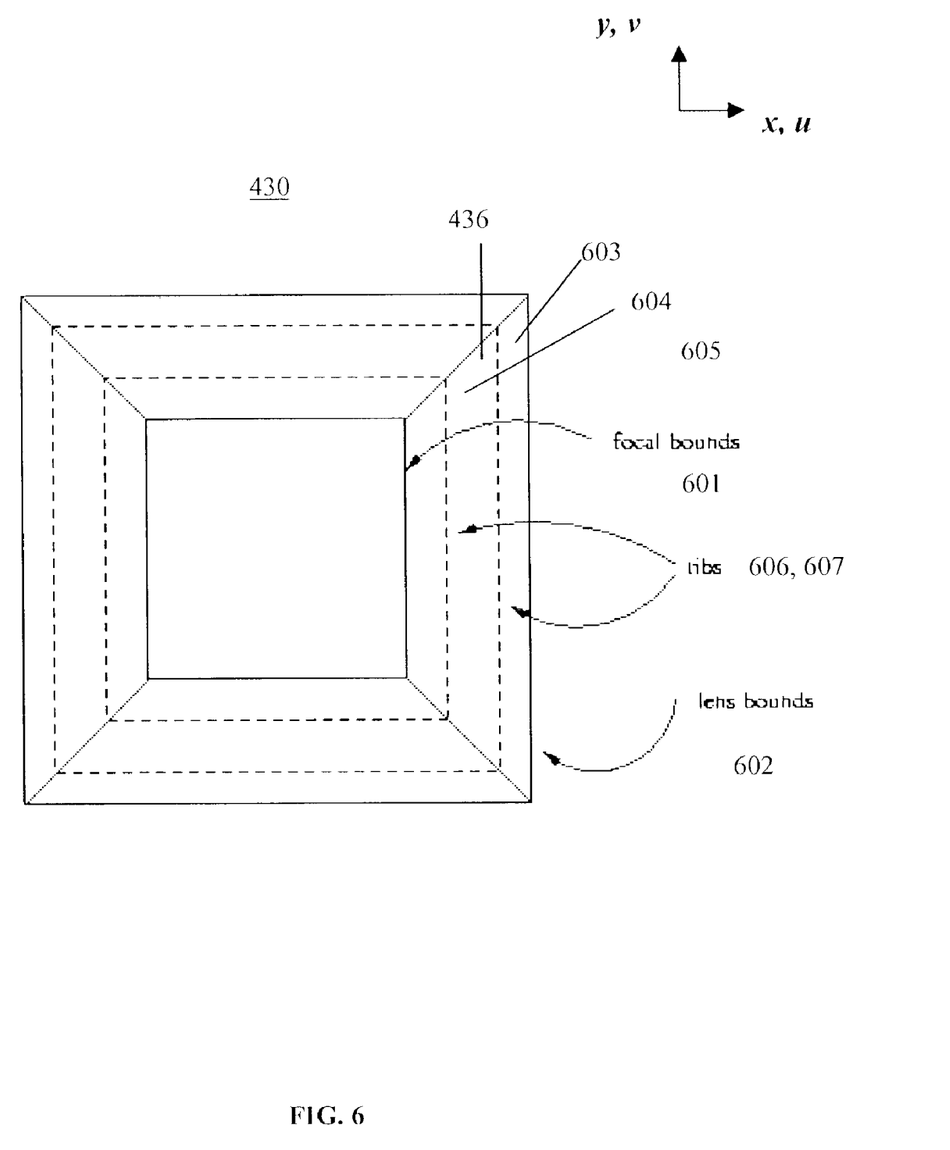
FIG. 6 is a top view of a pyramid lens illustrating the subdivision of shoulder regions to accommodate irregular shoulder shapes in accordance with an embodiment of the invention; and, FIG. 7 is a flow chart illustrating a general method for generating a pyramid lens presentation of a region-of-interest in accordance with an embodiment of the invention.

FIG. 6 is a top view of a pyramid lens 430 illustrating the subdivision of shoulder regions 434, 435, 436, 437 to accommodate irregular shoulder shapes in accordance with an embodiment of the invention. Here, interpolation is used between the focal bounding rectangle 601 and the lens bounding rectangle 602 in order to determine texture coordinates. This results in generally flat shoulders 434, 435, 436, 437. In fact, as will be described below, the shoulders are visually perceived as being slightly curved due to perspective foreshortening. In accordance with an embodiment of the invention, if it is desired that a shoulder 436 be irregularly shaped, as defined by a shoulder function (e.g. curved, etc.), then the shoulder region 436 can be subdivided into multiple quadrilaterals 603, 604, 605 by "ribs" 606, 607 as shown in FIG. 6. For each of these ribs 606, 607, both source raster undisplaced coordinates and target raster displaced coordinates are calculated. Then, for determining texture coordinates, interpolation is used between individual ribs 606, 607. These texture coordinates are used to fill the target image using the method described above. This operation results in an irregularly shaped shoulder region, as defined by the arbitrary shoulder function, that is accurate to a resolution easily determined by the number and position of the ribs 606, 607. Note that the lens transformation can automatically apply the shoulder function so that the transformed ribs are in the shape of the shoulder function.

It is known that linearly interpolating 2D textures in 3D space (as described above) can result in artificial curvature of the textures. Methods for overcoming this artificial curvature are also known. These methods may be easily integrated into the rendering method of the present invention, if desired. In accordance with an embodiment of the invention, one method of overcoming artificial curvature to produce perspective correct texturing is as follows. When texture coordinates are interpolated, the value $1/z$ for each calculated point is interpolated along with the values of $u/z$ and $v/z$, where z is the distance from the viewpoint 240 to a point on the lens 230, 430. The interpolated $1/z$ value at any point is used to find a z value. This z value is then multiplied by the interpolated $u/z$ or $v/z$ values to find the correct u or v values for rendering of the texture. Thus, rather than simply interpolating u and v values, the value $1/z$, $u/z$, and $v/z$ are interpolated to determine the correct values for u and v for each point.

In accordance with an embodiment of the invention, optional antialiasing is supported. If antialiasing is desired when copying slices, the coverage of the target slice 504 on the source image space 501 can be calculated. This might result in, for example, a 1-pixel wide target slice 504 mapping to a 3-pixel wide source slice 503. The 3-pixel wide source slice 503 can then be compressed to a 1-pixel wide slice when it is copies. If antialiasing is not desired, the source slice 503 can be assumed to be 1 pixel wide.

Figure 7:
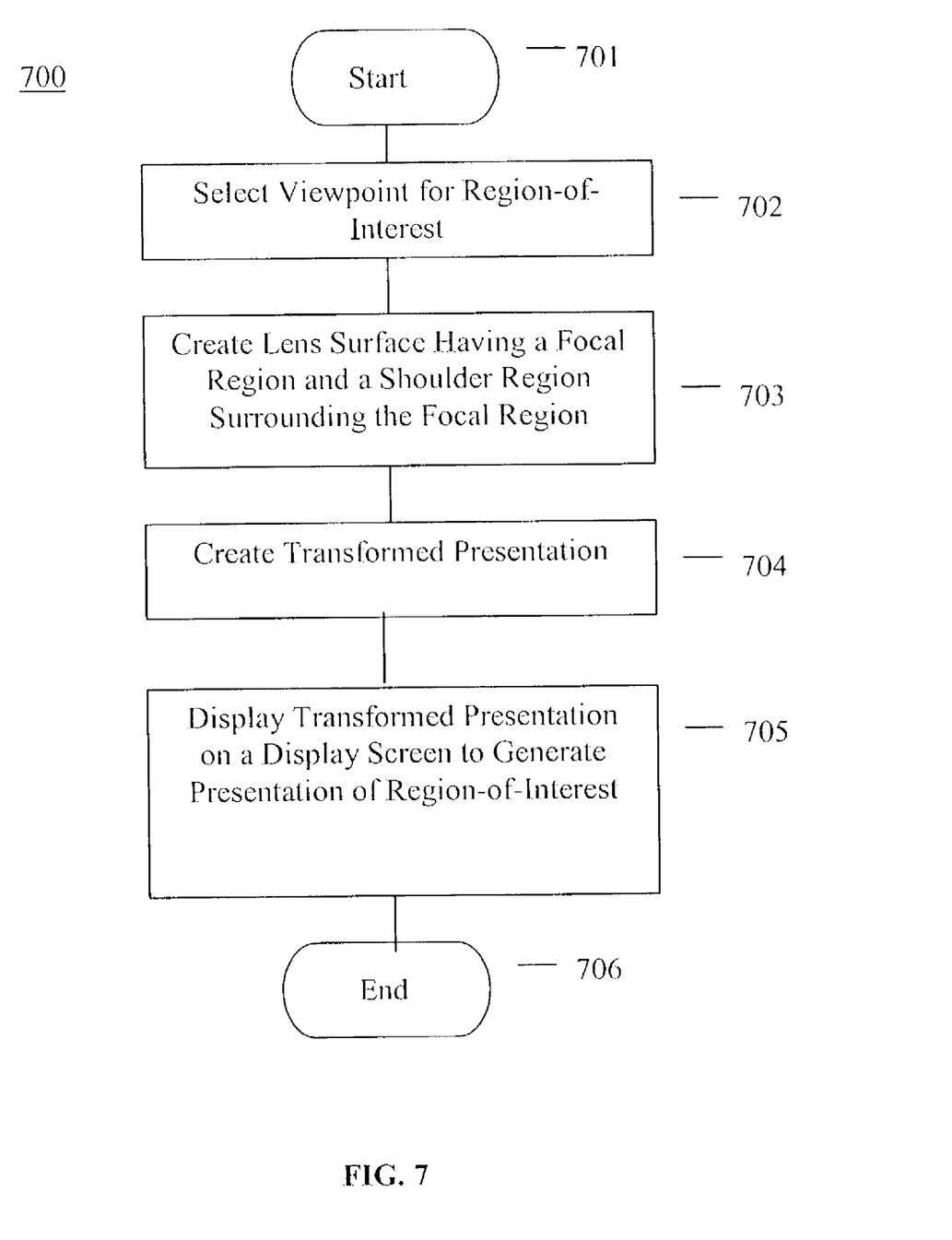

FIG. 7 is a flow chart 700 illustrating a general method for generating a pyramid lens presentation of a region-of-interest in accordance with an embodiment of the invention. At step 701, the method starts. At step 702, a viewpoint 240 for the region-of-interest 433 is selected. At step 703, a lens surface 430 for the region-of-interest 433 is created. The lens surface has a focal region 433 and a shoulder region 434, 435, 436, 437 surrounding the focal region 433. At step 704, a transformed presentation is created by: determining boundaries in the representation for the focal region and the shoulder region; determining boundaries on the lens surface corresponding to the boundaries in the representation by applying a distortion function defining the lens surface to the boundaries in the representation; perspectively projecting the boundaries on the lens surface 430 onto a plane 201 spaced from the viewpoint 240; and, copying information in the representation lying within the boundaries in the representation onto the focal region 433 and the shoulder region 434, 435, 436, 437 of the lens surface 430 using respective focal region and shoulder region stretch bit-block transfer operations. At step 705, the transformed presentation is displayed on a display screen 340 to generate the presentation of the region-of-interest 433. At step 706, the method ends.

The lens surface shape is generally a pyramidal frustum shape 430 having a top and a plurality of sides. The pyramidal frustum shape can be a right square with a square shaped top and with first, second, third, and fourth quadrilateral shaped sides. The focal region 433 is generally the top of the pyramidal frustum shape and the shoulder region includes the first, second, third, and fourth sides 434, 435, 436, 437. The sides can be subdivided into a plurality of horizontal or vertical slices 504 which can be one pixel high or wide.

The steps of determining boundaries 704 in the representation for the shoulder region and determining boundaries on the lens surface corresponding to the boundaries in the representation include: determining boundaries in the representation 530, 531, 532, 533 for each of the plurality of slices 503 and determining boundaries on the lens surface 520, 521, 522, 523 corresponding to the boundaries in the representation for each of the plurality of slices 504, respectively. The boundaries can be determined by interpolation. And, the shoulder region stretch bit-block transfer operation can include respective shoulder region stretch bit-block transfer operations for each of the plurality of slices 503, 504.

The sides 434, 435, 436, 437 of the pyramidal surface can be subdivided into a plurality of quadrilaterals 603, 604, 605 by a plurality of horizontal or vertical ribs 606, 607 (i.e. parallel to the basal plane 210). The plurality of quadrilaterals and ribs can include a plurality of slices. The steps of determining boundaries 704 in the representation for the shoulder region and determining boundaries on the lens surface corresponding to the boundaries in the representation can include: determining boundaries in the representation for each of the plurality of ribs and determining boundaries on the lens surface corresponding to the boundaries in the representation for each of the plurality of ribs, respectively. The shoulder region stretch bit-block transfer operation can include respective shoulder region stretch bit-block transfer operations for each of the plurality of ribs or slices. And, information for the lens surface lying between the plurality of ribs or slices can be determined by interpolation.

The step of copying 704 can include scaling the information. This scaling can include anti-aliasing. Interpolation can include linear interpolation and perspective correct interpolation. In addition, the distortion function can include shoulder functions defining the shoulder regions.

The lens parameters used to describe a lens according to the present invention may include such lens position, focal region shape, shoulder function, number of ribs, location of ribs, and a folding vector. These parameters can be formatted into a format suitable for transmission over a network (e.g. compressed or encrypted) and sent from the data processing system 300 to a remote machine. This is advantageous in situations where remote machines need to synchronize their presentations.

In addition, lens parameters such as lens position, focal region shape, shoulder function, number of ribs, location of ribs, and folding vector can be stored in a file which may be compressed or encrypted. This is advantageous as it allows a lens surface to be archived for later retrieval or sharing with other systems and users.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method comprising generating a presentation of a region of interest in an information representation for display on a display screen of a data processing system by:

establishing, by the data processing system, a first boundary for said region-of-interest in said information representation, said first boundary surrounded by shoulder regions;

subdividing, by the data processing system, each of said shoulder regions into two or more slice regions to approximate said shoulder regions, each slice region having a respective first slice region boundary in said representation;

determining, by the data processing system, a second boundary and second slice region boundaries for said presentation corresponding to said first boundary and said first slice region boundaries in said representation by displacing said first boundary and said first slice region boundaries in said representation onto a lens to produce displaced boundaries;

transforming, by the data processing system, information that describes a plurality of pixels from within said first boundary and a plurality of pixels from within each said first slice region boundary in said representation for display within said second boundary and said second slice region boundaries, respectively, for said presentation using respective stretch bit-block transfer operations, said stretch bit-block transfer operations being defined by said first boundary and each said first slice region boundary in said representation, respectively and said second boundary and said second slice region boundaries for said presentation; and displaying said presentation on said display screen of the data processing system.

2. The method of claim 1 further comprising prospectively projecting said displayed boundaries onto a plane in a direction aligned with a viewpoint for said region-of-interest.

3. The method of claim 1 wherein said information is pixel-based information.

4. The method of claim 3 wherein said first slice region boundaries are aligned with pixel boundaries in said representation.

5. The method of claim 1 and further comprising determining boundaries in said representation for each of said slice regions by interpolation.

6. The method of claim 5 wherein said interpolation is linear interpolation.

7. The method of claim 5 wherein said interpolation is perspective correct interpolation.

8. The method of claim 1 and further comprising determining second slice region boundaries for said presentation for each of said slice regions by a line drawing algorithm.

9. The method of claim 1 and further comprising subdividing said shoulder regions into one or more sub-regions by one or more ribs.

10. The method of claim 9 and further comprising subdividing each of said sub-regions into one or more slice regions to approximate said sub-regions and to define first and second sub-region slice region boundaries for said stretch bit-block transfer operations.

11. The method of claim 10 and further comprising determining first boundaries in said representation and second boundaries for said presentation for each of said sub-regions, respectively.

12. The method of claim 1 wherein said transferring includes scaling said information.

13. The method of claim 1 wherein said lens is defined by a distortion function.

14. The method of claim 12 wherein said scaling includes antialiasing.

15. The method of claim 1 and further comprising storing parameters for said lens as a file.

16. The method of claim 15 wherein said parameters include at least one of a lens position, a shape for said boundary, a shape for each of said shoulder regions, a number of ribs, a location of ribs, or a folding vector.

17. The method of claim 16 wherein said file includes at least one of a compressed file or an encrypted file.

18. The method of claim 17 and further comprising transmitting said file over a network to a remote processor for generating a local presentation.

19. The method of claim 1, wherein each said shoulder region includes a side that does not contact said first boundary and does contact another said side of another said shoulder region.

20. One or more tangible computer-readable media comprising instructions that if executed by a data processing system, cause the data processing system to generate a presentation of a region of interest in an information representation for display on a display screen by:

establishing a first boundary for said region-of-interest in said information representation, said first boundary surrounded by shoulder regions;

subdividing each of said shoulder regions into two or more slice regions to approximate said shoulder regions, each slice region having a respective first slice region boundary in said representation;

determining a second boundary and second slice region boundaries for said presentation corresponding to said first boundary and said first slice region boundaries in said representation by displacing said first boundary and said first slice region boundaries in said representation onto a lens to produce displaced boundaries; and transforming information that describes a plurality of pixels from within said first boundary and a plurality of pixels from within each said first slice region boundary in said representation for display within said second boundary and said second slice region boundaries, respectively, for said presentation using respective stretch bit-block transfer operations, said stretch bit-block transfer operations being defined by said first boundary and each said first slice region boundary in said representation, respectively and said second boundary and said second slice region boundaries for said presentation.

21. The tangible computer-readable media of claim 20 wherein the generation of the presentation of the region of interest further comprises prospectively projecting said displayed boundaries onto a plane in a direction aligned with a viewpoint for said region-of-interest.

22. The tangible computer-readable media of claim 20 wherein said information is pixel-based information.

23. The tangible computer-readable media of claim 20 wherein the generation of the presentation of the region of interest further comprises determining boundaries in said representation for each of said slice regions by interpolation.

24. The tangible computer-readable media of claim 20 wherein the generation of the presentation of the region of interest further comprises determining second slice region boundaries for said presentation for each of said slice regions by a line drawing algorithm.

25. The tangible computer-readable media of claim 20 wherein the generation of the presentation of the region of interest further comprises:

subdividing said shoulder regions into one or more sub-regions by one or more ribs;

subdividing each of said sub-regions into one or more slice regions to approximate said sub-regions and to define first and second sub-region slice region boundaries for said stretch bit-block transfer operations; and determining first boundaries in said representation and second boundaries for said presentation for each of said sub-regions, respectively.

26. The tangible computer-readable media of claim 20 wherein the transforming includes scaling said information.

27. The tangible computer-readable media of claim 20 wherein said lens is defined by a distortion function.

28. The tangible computer-readable media of claim 20 wherein the generation of the presentation of the region of interest further comprises storing parameters for said lens as a file.

29. The tangible computer-readable media of claim 20 wherein each said shoulder region includes a side that does not contact said first boundary and does contact another said side of another said shoulder region.

30. A data processing system comprising a processor and memory having instructions that are executable by the processor to generate a presentation of a region of interest in an information representation for display on a display screen by:

establishing a first boundary for said region-of-interest in said information representation, said first boundary surrounded by shoulder regions;

subdividing each of said shoulder regions into two or more slice regions to approximate said shoulder regions, each slice region having a respective first slice region boundary in said representation;

determining a second boundary and second slice region boundaries for said presentation corresponding to said first boundary and said first slice region boundaries in said representation by displacing said first boundary and said first slice region boundaries in said representation onto a lens to produce displaced boundaries; and transforming information that describes a plurality of pixels from within said first boundary and a plurality of pixels from within each said first slice region boundary in said representation for display within said second boundary and said second slice region boundaries, respectively, for said presentation using respective stretch bit-block transfer operations, said stretch bit-block transfer operations being defined by said first boundary and each said first slice region boundary in said representation, respectively and said second boundary and said second slice region boundaries for said presentation.

31. The data processing system of claim 30 wherein the generation of the presentation of the region of interest further comprises prospectively projecting said displayed boundaries onto a plane in a direction aligned with a viewpoint for said region-of-interest.

32. The data processing system of claim 30 wherein said information is pixel-based information.

33. The data processing system of claim 30 wherein the generation of the presentation of the region of interest further comprises determining boundaries in said representation for each of said slice regions by interpolation.

34. The data processing system of claim 30 wherein the generation of the presentation of the region of interest further comprises determining second slice region boundaries for said presentation for each of said slice regions by a line drawing algorithm.

35. The data processing system of claim 30 wherein the generation of the presentation of the region of interest further comprises:

subdividing said shoulder regions into one or more sub-regions by one or more ribs;

subdividing each of said sub-regions into one or more slice regions to approximate said sub-regions and to define first and second sub-region slice region boundaries for said stretch bit-block transfer operations; and determining first boundaries in said representation and second boundaries for said presentation for each of said sub-regions, respectively.

36. The data processing system of claim 30 wherein the transforming includes scaling said information.

37. The data processing system of claim 30 wherein said lens is defined by a distortion function.

38. The data processing system of claim 30 wherein the generation of the presentation of the region of interest further comprises storing parameters for said lens as a file.

39. The data processing system of claim 30 wherein each said shoulder region includes a side that does not contact said first boundary and does contact another said side of another said shoulder region.

* * * * *